(12) United States Patent
Meggiolan

(10) Patent No.: US 7,273,258 B2
(45) Date of Patent: *Sep. 25, 2007

(54) BICYCLE WHEEL HUB

(75) Inventor: Mario Meggiolan, Vicenza (IT)

(73) Assignee: Campagnolo, S.r.l., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/149,507

(22) Filed: Jun. 10, 2005

(65) Prior Publication Data

US 2005/0253448 A1  Nov. 17, 2005

Related U.S. Application Data

(63) Continuation of application No. 10/615,000, filed on Jul. 8, 2003, now Pat. No. 7,066,558, and a continuation of application No. 10/073,410, filed on Feb. 13, 2002, now Pat. No. 6,688,704, which is a continuation of application No. 10/073,405, filed on Feb. 13, 2002, now Pat. No. 7,041,186.

(30) Foreign Application Priority Data

| Feb. 13, 2001 | (IT) | ............ TO2001A0117 |
| Feb. 13, 2001 | (IT) | ............ TO2001A0118 |
| Feb. 13, 2001 | (IT) | ............ TO2001A0119 |

(51) Int. Cl.
*B60B 5/02* (2006.01)
*B60B 1/04* (2006.01)

(52) U.S. Cl. .................. 301/110.5; 301/64.702
(58) Field of Classification Search ............. 156/156, 156/173, 194; 301/95.102, 95.106, 110.5, 301/64.701, 64.702, 64.703, 95.101, 95.103; 29/426.5

See application file for complete search history.

(56) References Cited

U.S. PATENT DOCUMENTS

| 2,794,481 A | 6/1957 | Anderson |
| 3,369,843 A * | 2/1968 | Prew ................ 301/64.6 |
| 3,546,060 A * | 12/1970 | Dornheim et al. ........ 442/352 |

(Continued)

FOREIGN PATENT DOCUMENTS

DE  3406650 A1  9/1985

(Continued)

*Primary Examiner*—Russell D. Stormer
(74) *Attorney, Agent, or Firm*—Volpe and Koenig, P.C.

(57) ABSTRACT

A one-piece wheel hub of a bicycle wheel made from layered structural fiber based material, preferably carbon fiber material. The wheel hub is preferably formed by applying layers of the fiber based material to an expandable core to form a tubular body. The tubular body may be cured, during which time the core expands, by applying radial pressure to the tubular body.

20 Claims, 11 Drawing Sheets

U.S. PATENT DOCUMENTS

| | | | |
|---|---|---|---|
| 3,917,352 A | 11/1975 | Gageby | |
| 4,017,348 A | 4/1977 | Shumaker | |
| 4,126,659 A | 11/1978 | Blad | |
| 4,213,234 A | 7/1980 | Ware | |
| 4,294,490 A | 10/1981 | Woelfel | |
| 4,413,860 A * | 11/1983 | Prescott | 301/64.703 |
| 4,514,013 A * | 4/1985 | Woelfel et al. | 301/64.703 |
| 4,532,097 A | 7/1985 | Daniels et al. | |
| 4,595,242 A * | 6/1986 | Wehmeyer | 301/6.9 |
| 4,622,731 A * | 11/1986 | Kjell | 29/894.361 |
| 4,636,344 A * | 1/1987 | McDougall | 264/102 |
| 4,721,342 A * | 1/1988 | Daniels et al. | 301/64.703 |
| 4,749,235 A * | 6/1988 | McDougall | 301/64.703 |
| 4,832,414 A * | 5/1989 | Jones | 301/64.703 |
| 5,246,275 A | 9/1993 | Arredondo | |
| 5,266,249 A * | 11/1993 | Grimes et al. | 264/45.2 |
| 5,571,357 A * | 11/1996 | Darrieux et al. | 156/173 |
| 5,773,108 A | 6/1998 | Casebolt | |
| 6,347,839 B1 * | 2/2002 | Lew et al. | 301/95.102 |
| 6,568,767 B2 * | 5/2003 | Meggiolan | 301/110.5 |
| 6,688,704 B2 * | 2/2004 | Meggiolan | 301/110.5 |
| 6,926,370 B2 * | 8/2005 | Spoelstra | 301/64.703 |
| 7,066,558 B2 * | 6/2006 | Meggiolan | 301/110.5 |
| 2005/0067883 A1 * | 3/2005 | Meggiolan | 301/110.5 |
| 2005/0104441 A1 * | 5/2005 | Bertelson | 301/64.703 |

FOREIGN PATENT DOCUMENTS

| | | |
|---|---|---|
| DE | 4416796 | 11/1995 |
| GB | 2 165 498 A | 4/1986 |

* cited by examiner

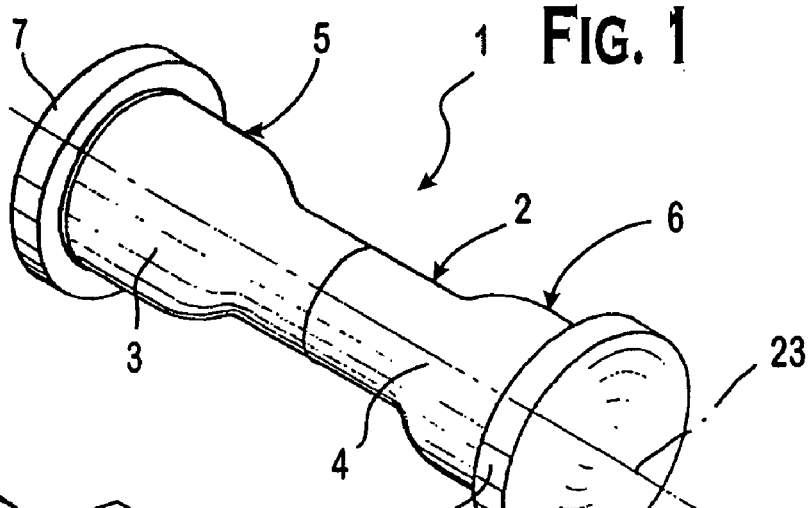
FIG. 1
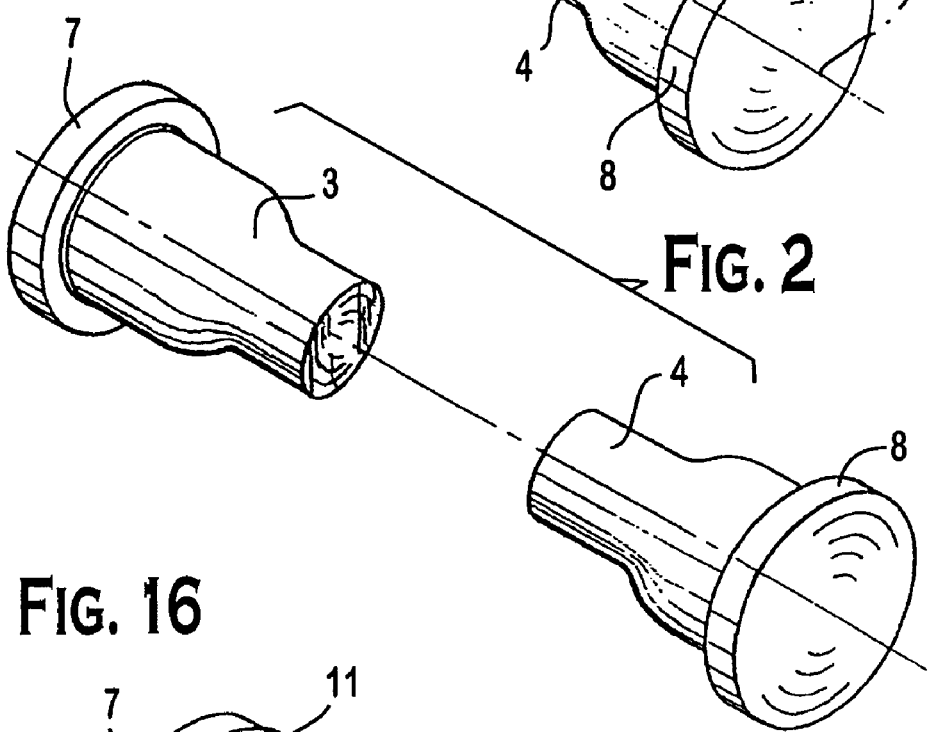
FIG. 2
FIG. 16
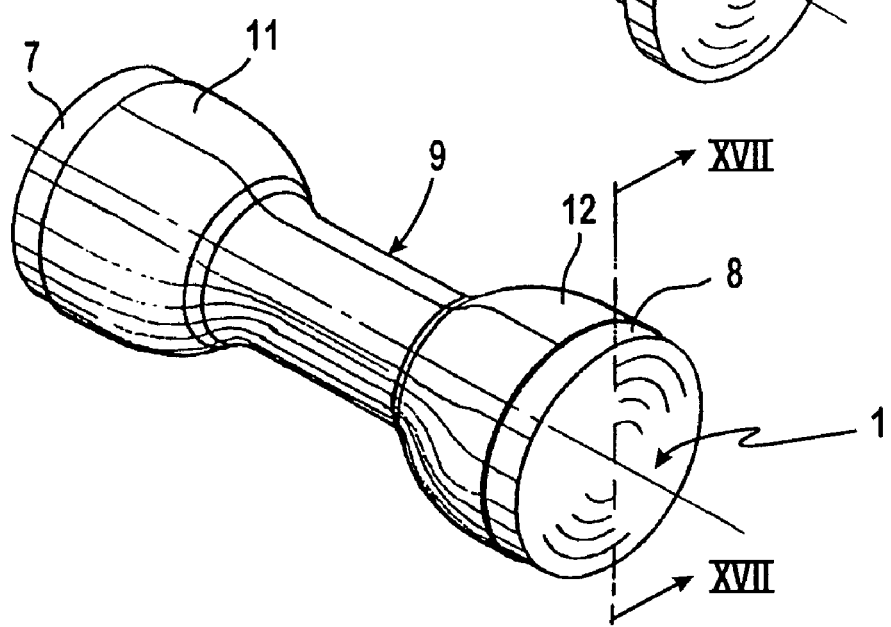

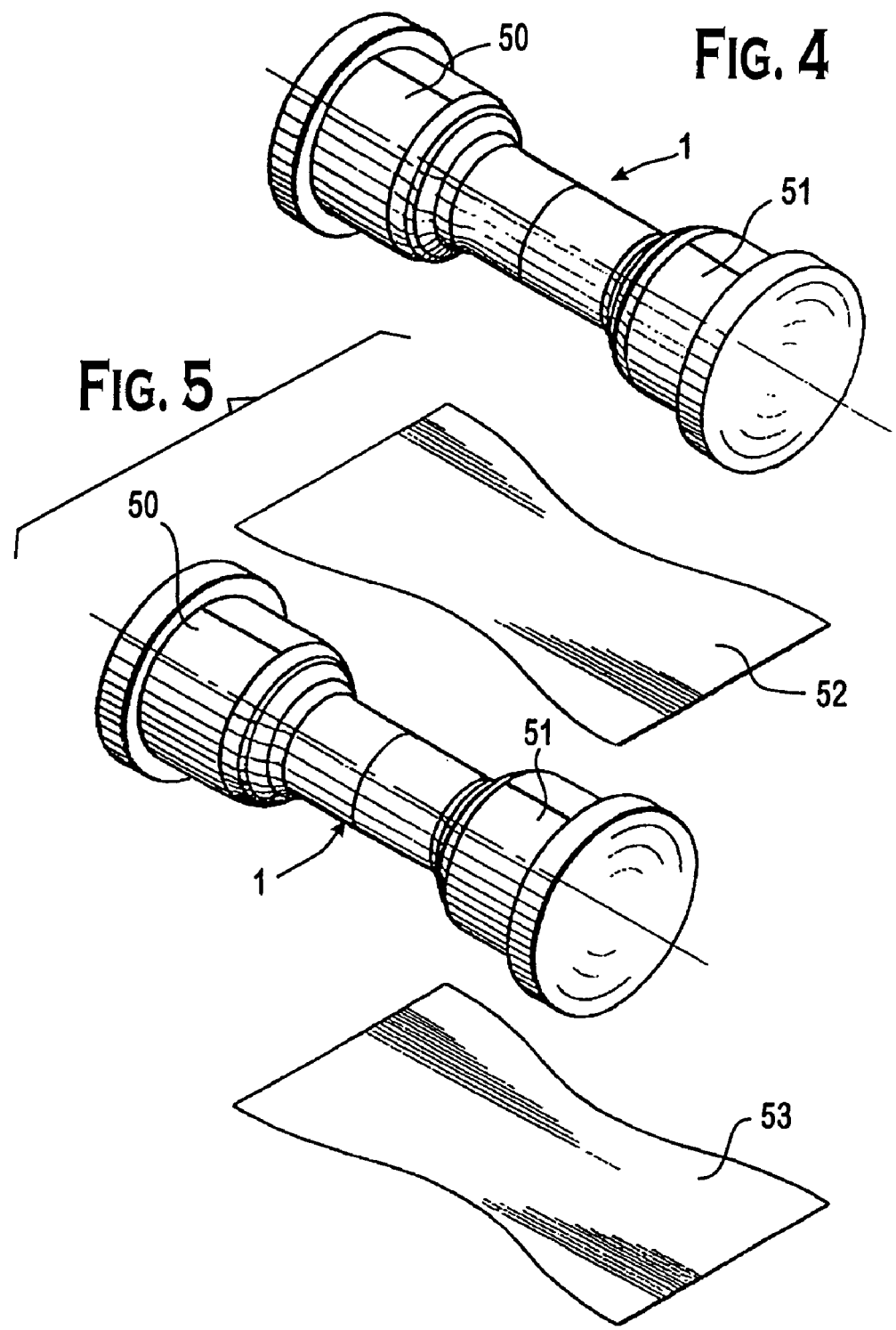

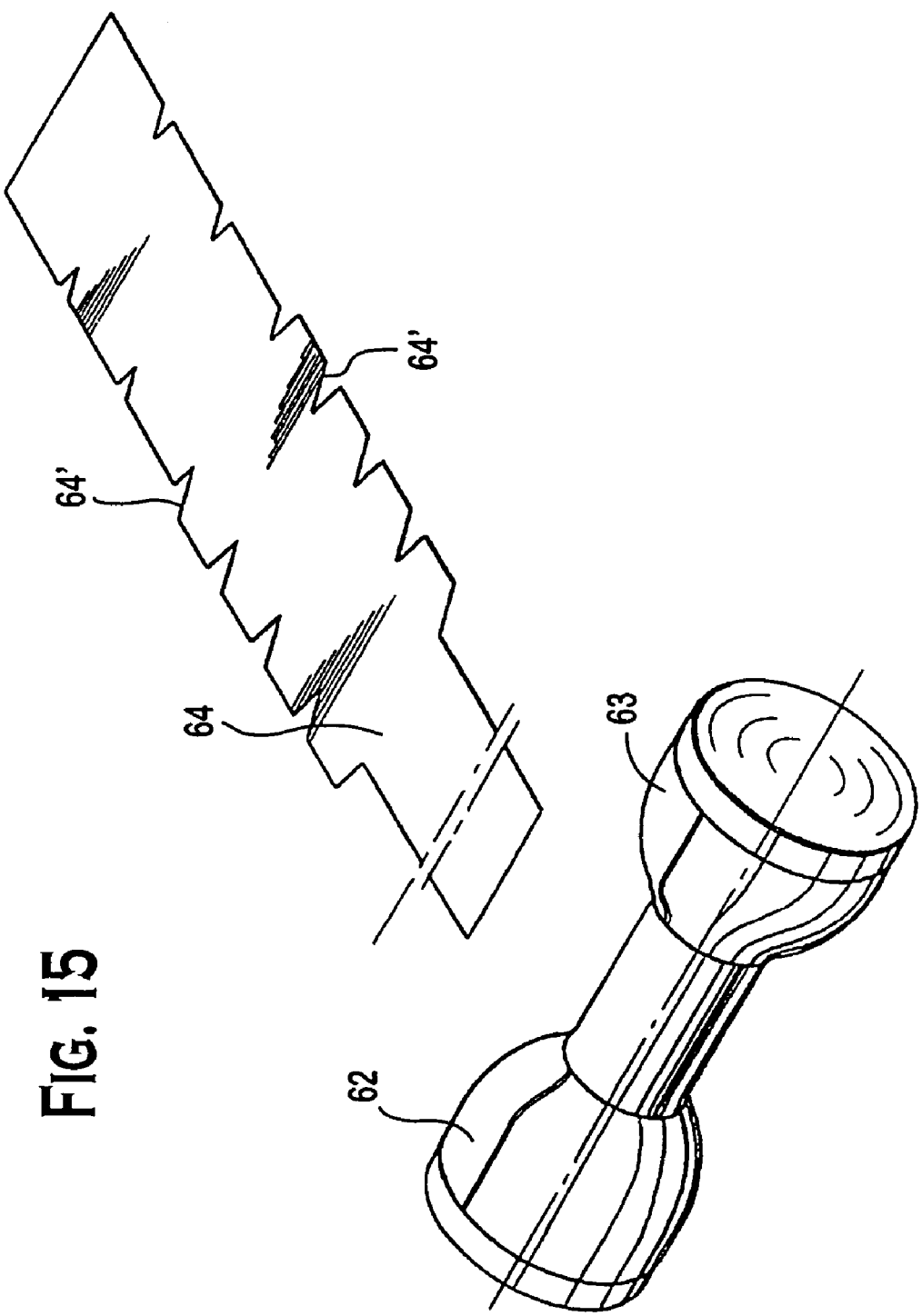

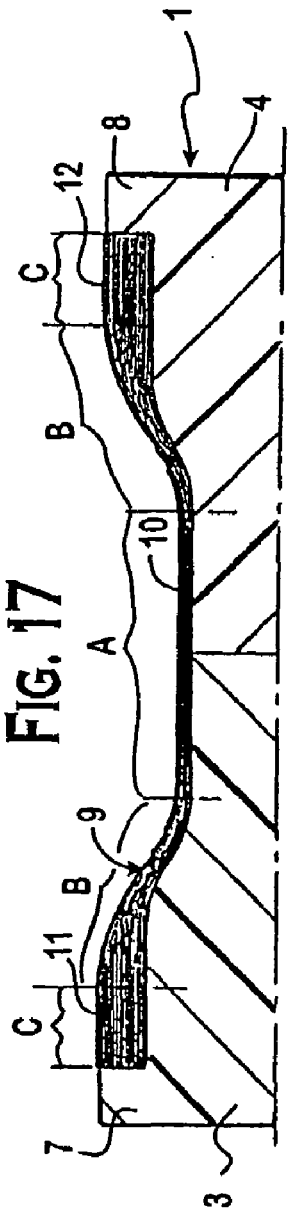
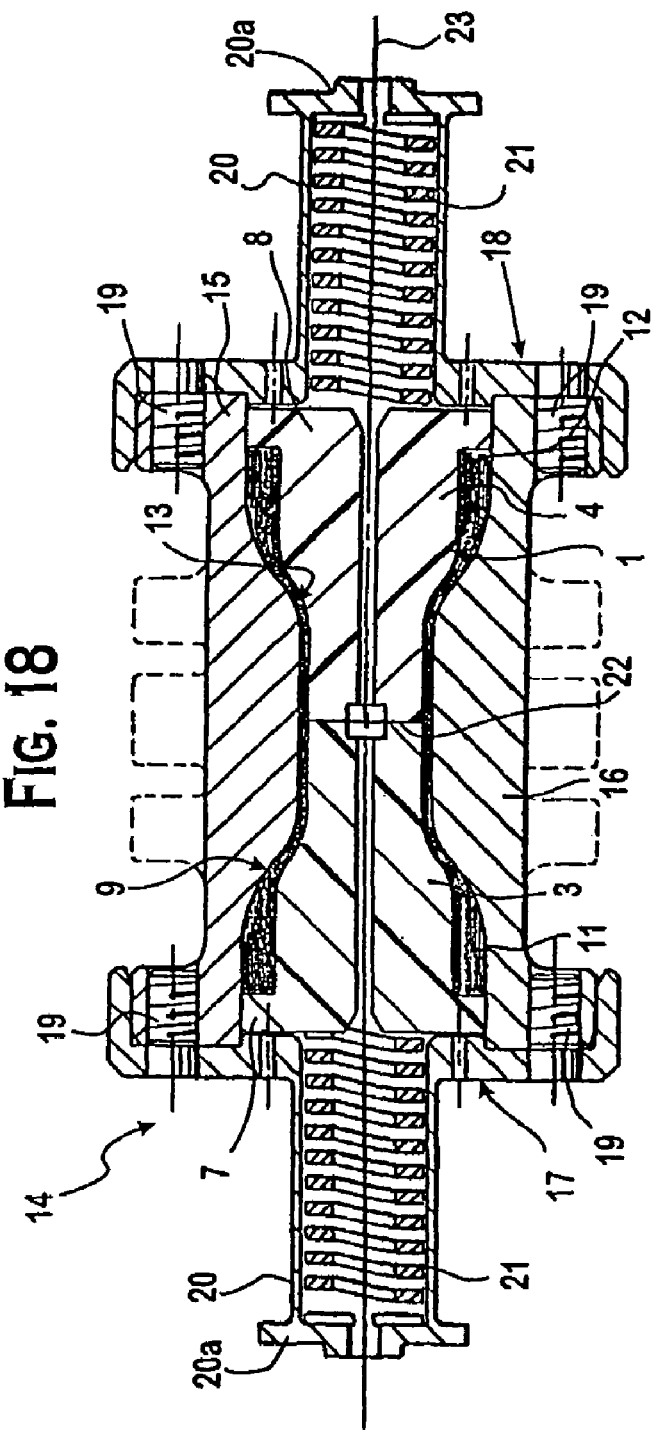
FIG. 17
FIG. 18

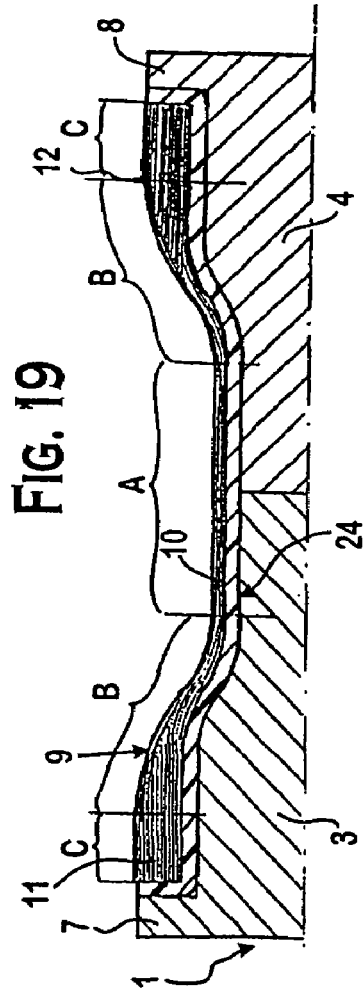
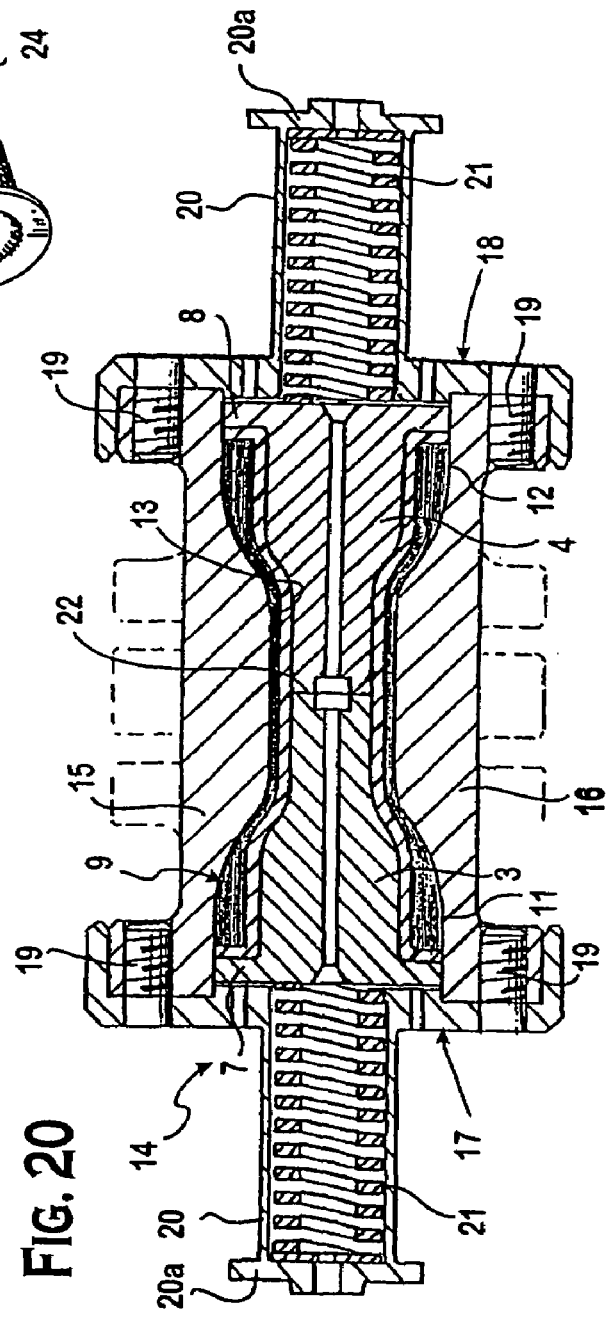

FIG. 22
FIG. A
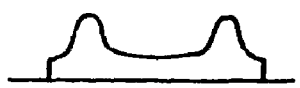
FIG. H
FIG. B
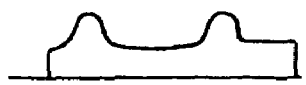
FIG. I
FIG. C
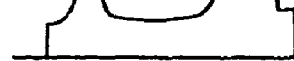
FIG. D
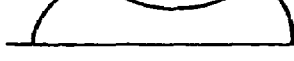
FIG. L
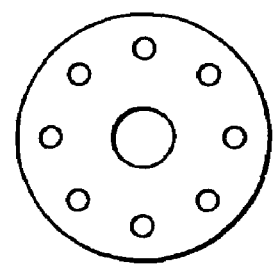
FIG. E
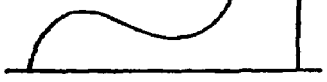
FIG. F
FIG. M
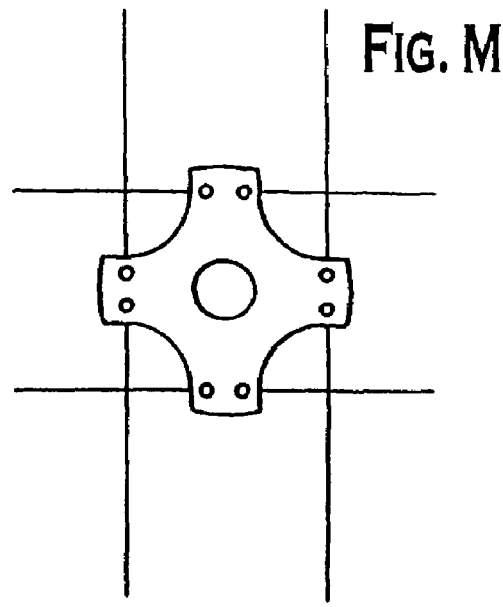
FIG. G

BICYCLE WHEEL HUB

CROSS REFERENCE TO RELATED APPLICATIONS

This application is a continuation of U.S. patent application Ser. No. 10/615,000, filed on Jul. 8, 2003, now U.S. Pat. No. 7,066,558, which in turn claims priority to U.S. Pat. No. 6,688,704 issued on Feb. 10, 2004, which also claims priority to U.S. patent application Ser. No. 10/073,405, also filed on Feb. 13, 2002, now U.S. Pat. No. 7,041,186. All of these prior applications are incorporated by reference as if fully set forth.

BACKGROUND

This invention relates to a method for fabricating the hub of a bicycle wheel, an apparatus for implementing the method and the bicycle wheel hub obtained by means of the said method.

The Applicant has recently conducted various studies and tests to make bicycle components, particularly bicycle wheel hubs, especially for spoke wheel competition bicycles, using structural fibre based material, typically carbon fibre based material. The advantage offered by this type of material is that of being lighter in weight with respect to the metallic materials used in the past given equal structural characteristics. Making a hub out of a single part of carbon fibre based material was difficult, at least utilising the technologies available at that time, due to the typical conformation of the bicycle wheel hub of the type described above. The hubs used in modern bicycle wheels present a complex cylindrical shape, with a central constant diameter section and two bell-shaped end sections with a wider diameter or other, even more complex, shapes. Additionally, it is desirable for the hub thickness to progressively increase from the central section towards the hub ends, so to ensure the necessary resistance characteristics in all areas of the hub, particularly on the ends, where the wheel spokes are anchored, while ensuring minimal weight at the same time.

The need of making a tubular body with the complex shapes described above has made it impossible to make the hub from a single part of structural fibre material, such as carbon fibre material.

SUMMARY OF THE INVENTION

The object of this invention is to overcome this technical problem.

In view of achieving this object, the invention provides a method for fabricating a bicycle wheel hub, characterised in that it comprises the following steps:
  providing an expandable core,
  applying a number of layers of structural fibre fabric incorporated in a plastic material matrix around the core to form a layered tubular body of predetermined shape and thickness around the core,
  arranging the core with the layered tubular body formed thereon in the cavity of a mould,
  increasing the temperature of the mould to a value sufficient to cause reticulation of the plastic material matrix,
  expanding the core for applying a pressure on the tubular body inside the mould, and
  removing the tubular body from the mould and from the core, so as to obtain a bicycle hub formed of a single piece of structural fibre material.

In a first embodiment, the expandable core is made of a synthetic material presenting a thermal dilatation coefficient exceeding $5 \times 10^{-15}$ mm/° C. and a maximum continuous heat resistance equal to at least 80° C., the expansion of the core being obtained through the dilation of the material forming the core when the temperature of the mould is increased.

Preferably, in this embodiment, the material forming the core has a thermal dilation coefficient exceeding $9 \times 10^{-5}$ mm/° C. and a maximum continuous thermal resistance temperature exceeding 100° C.

Again preferably, the material forming the core can be either PTFE (polytetrafluoroethene), or FEP (fluorinated ethene propene), or PCTFE (polychlorotrifluoroethene), or PVDF (polyfluorodivinylidene), or PE-HD (high density polyethylene).

The use of PTFE is widely preferred, due to the anti-adherence properties of this material, which are useful for detaching the core from the structural fibre moulded body, as well as its high continuous thermal resistance (260° C.), for its good thermal conductivity (0.25 W/m° C.) and for its good thermal capacity (specific heat), equal to 1.045 kJ/kg° C.

The method, which main phases are outlined above, can be used in general to make hubs of all shapes, also different from that described above. A highly preferred characteristic of this method is in the arrangement of the aforesaid core made of high thermal dilation synthetic material, preferably PTFE. This material presents the characteristic of being subject to high thermal dilation at relatively low temperatures, in the order of temperatures at which the plastic material in which the structural fibre fabric is incorporated reticulates.

In a second embodiment of the method of the invention, the expandable core includes a body of metal material covered with a deformable sheath made of an elastomeric material, the expansion of the core being obtained through the dilation of the material forming the sheath when the temperature of the mould is increased.

Preferably, in this embodiment, the elastomeric material forming the aforesaid sheath has a thermal dilation coefficient exceeding $15 \times 10^{-5}$ mm/° C. and a maximum continuous heat resistance temperature exceeding 100° C. Still preferably, this material is a synthetic rubber of the type marketed under the trademark AIRCAST 3700 by Airtech International Inc., Huntington Beach, Calif., USA.

According to a further preferred feature of the second embodiment, the sheath is pre-formed according to the configuration of the core and is dimensioned in order to be applied on the core by slightly stretching it, so that the sheath adheres to the core due to its elasticity.

In a third embodiment of the method of the invention, the expandable core includes a body of metal material without any deformable sheath. In this embodiment the metallic core is divided in sectors, which can be expanded by means of mechanical means or, if provided by elastomeric junctions, by means of a gas injected inside the metallic core.

Structural fibre fabrics incorporated in a plastic material matrix are known and have been used for some time. They are made with yarn obtained from structural fibres, such as carbon fibres, for example. These fabrics are then subjected to a calendering process to associate them to a plastic material matrix, typically a thermosetting plastic material.

In the method of the invention, the structural fibres are selected among carbon fibres, glass fibres, Kevlar fibres, or any combinations thereof.

According to another important feature of the invention, the layers of fabric on the core comprise one or more fabric strips wrapped around at least one axially limited portion of the core, to confer thickness to the tubular body, as well as a plurality of fabric plies extending along the core axis, to confer resistance in the axial direction to the tubular body.

Finally, this invention also relates to a bicycle wheel hub, characterised in that it has a tubular body made of a plurality of layers of structural fibre fabric incorporated in a plastic material matrix, said layers including one or more fabric strips wrapped around at least one axially limited portion of the hub body as well as a plurality of fabric plies extending along the hub axis.

BRIEF DESCRIPTION OF THE DRAWINGS

This invention will be better explained by the following detailed descriptions with reference to the accompanying figures as non-limiting examples, whereas:

FIG. 1 generally indicates a perspective view of the core belonging to the apparatus used in the method according to a first embodiment of this invention, FIG. 2 illustrates a perspective view of the two elements forming the core in FIG. 1 in a reciprocally distanced condition, FIGS. from 3 to 15 are perspective views illustrating the various phases of applying the layers of the carbon fibre fabrics on the core shown in FIG. 1, FIG. 16 is a perspective view illustrating the core in FIG. 1 completely coated with layers of carbon fibre fabrics, FIG. 17 is a partial cross-section view of the assembly illustrated in FIG. 16, with two elements forming the core and the pre-formed tubular layered body over them, FIG. 18 is a cross-sectional view of the mould usable in the method according to the first embodiment, FIGS. 19, 20 are variant of FIGS. 17, 18 corresponding to a second embodiment of the invention, FIG. 21 is a perspective view of the sheath of elastomeric material which is used in the method according to the second embodiment, and FIG. 22 shows wheel hubs with different shapes labeled as FIGS. A-M.

DETAILED DESCRIPTION OF THE INVENTION

Figure 3:
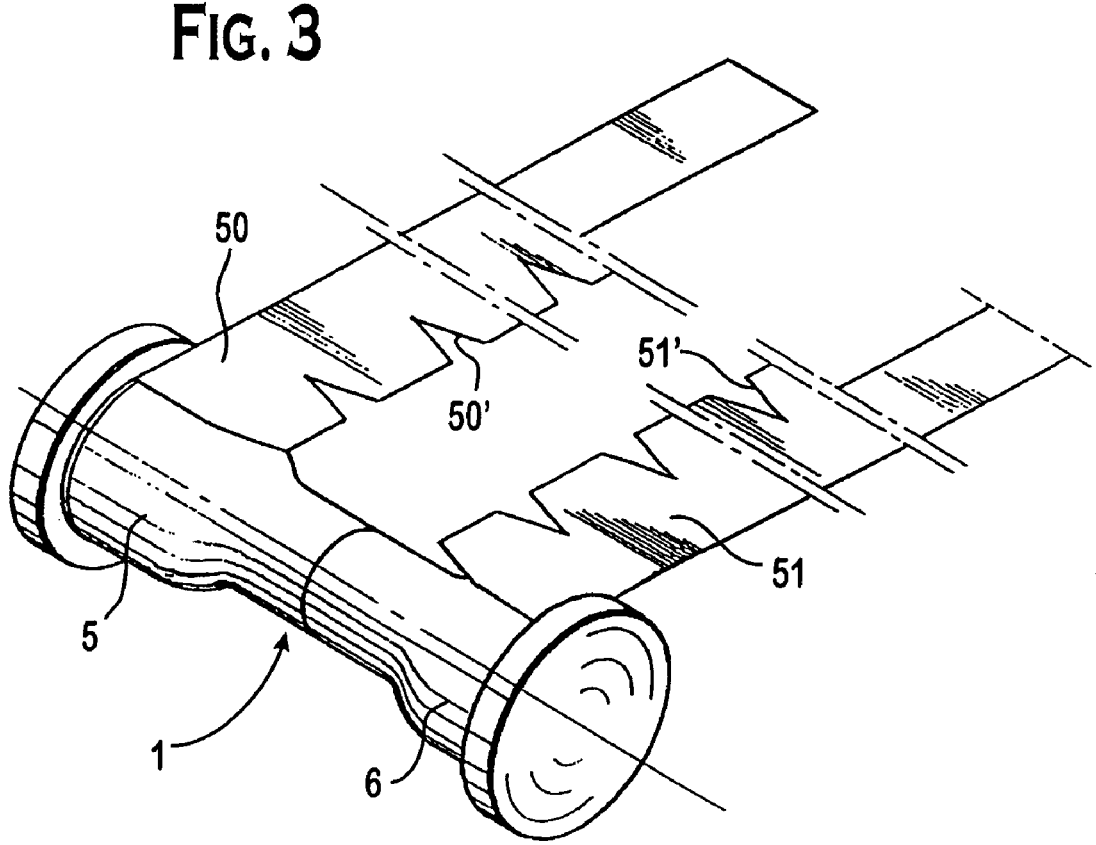

With reference to FIG. 1, numeral 1 generically indicates a generally cylindrical core, consisting of two separate elements 3, 4. In the example shown, each of the two elements 3, 4 is made of a single piece of PTFE. In the closed condition illustrated in FIG. 1, the two elements 3, 4, form a substantially cylindrical core, with a central section 2 presenting a constant diameter and two bell-shaped end sections 5, 6 with an enlarged diameter, ending with two ring flanges 7, 8.

With reference to figures from 3 to 16, the core 1 is externally coated with layers of structural fibre based fabric (typically carbon based fabric) incorporated in a thermosetting plastic material matrix. The various phases of the layering process are illustrated in the figures from 3 to 15.

With reference to FIG. 3, in a first phase, a strip 50 of carbon fibre fabric is wrapped around on bell-shaped end 5 of the core 1 (e.g. five complete turns around the core). After this, the same operation is carried out on the strip of fabric 51 over the end 6 of the core 1. FIG. 4 illustrates the core 1 with two windings 50, 51 obtained at the end of the aforesaid phase.

The strips 50 and 51 present triangular cuttings 50' and 51' to allow to such strips to enclose a tubular area with different diameters without leaving empty spaces or forming overlappings.

Figure 7:
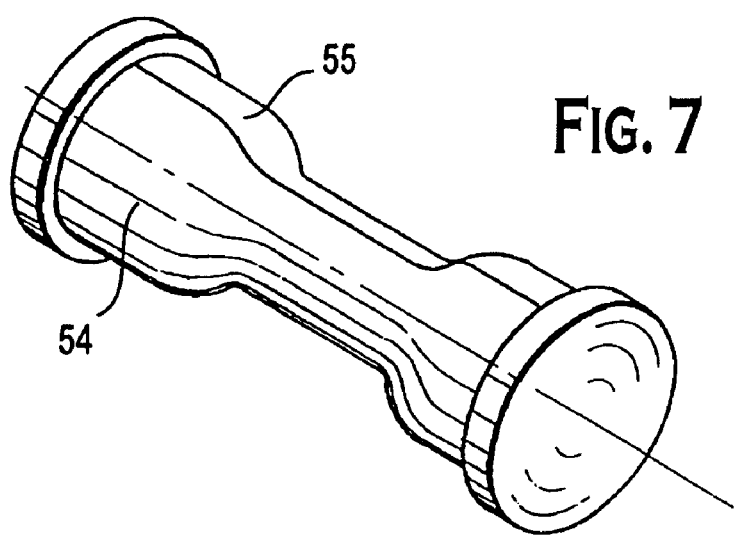
Figure 6:
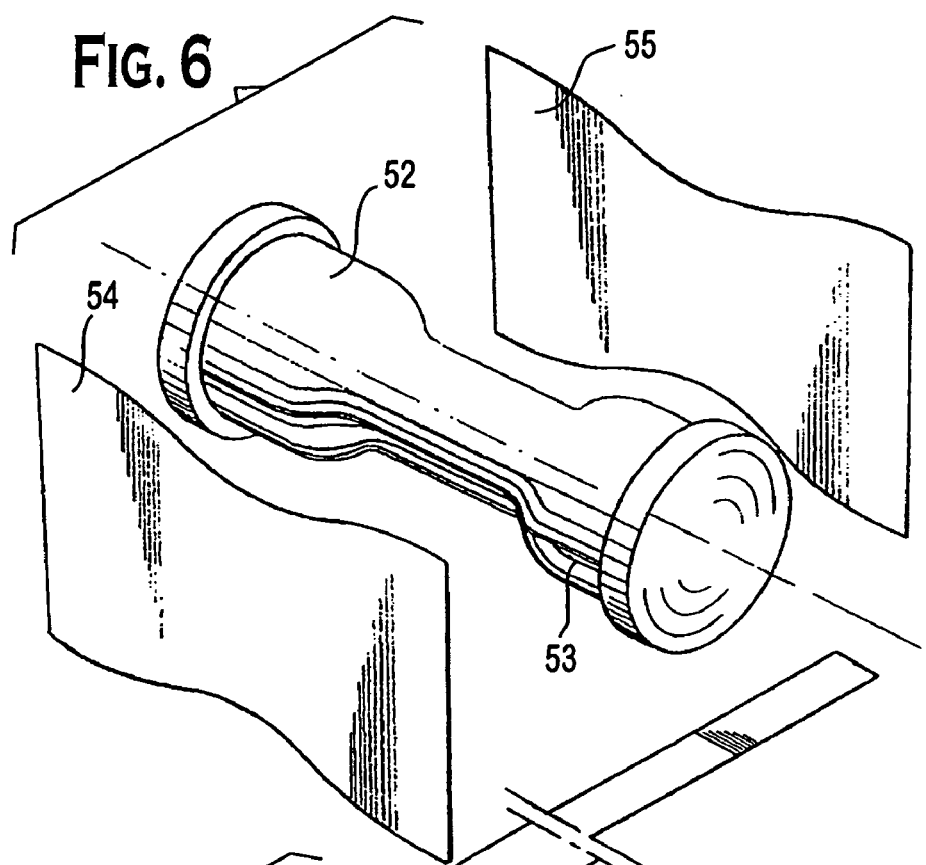

A first piece, or ply, 52, a second ply 53 (FIG. 5), a fourth ply 54 and a fifth ply 55 (FIG. 6) are then applied to the body thus obtained in four subsequent phases. All the plies 52, 53, 54, 55 extend for the entire axial length of the core, while each one only partially covers the core in the circumferential direction. As can be seen in FIGS. 5, 6, they are applied on four different sides, arranged at an angle of 90° one with respect to the other. Firstly, two plies 52, 53, which are diametrically opposite are applied, after which two other plies 54, 55, which are also diametrically opposite and oriented at 90° with respect to the plies 52, 53 are applied. In this way a couple of plies cover the entire circumference of the tubular body and the junctions of two couples of plies are alternated, in particular spaced apart of 90°. FIG. 7 illustrates the structure obtained at the end of the phases illustrated in FIGS. 5, 6. The function of the plies described above is very important, because the plies connect the strips on the end of the core thus providing axial resistance to the layered body.

Figure 10:
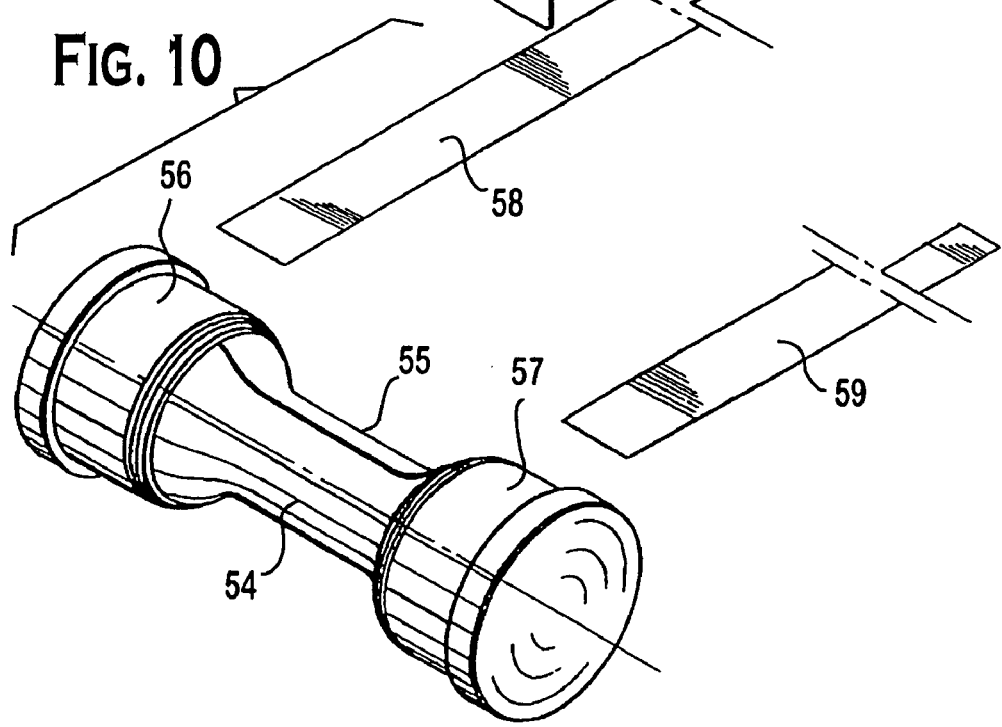
Figure 8:
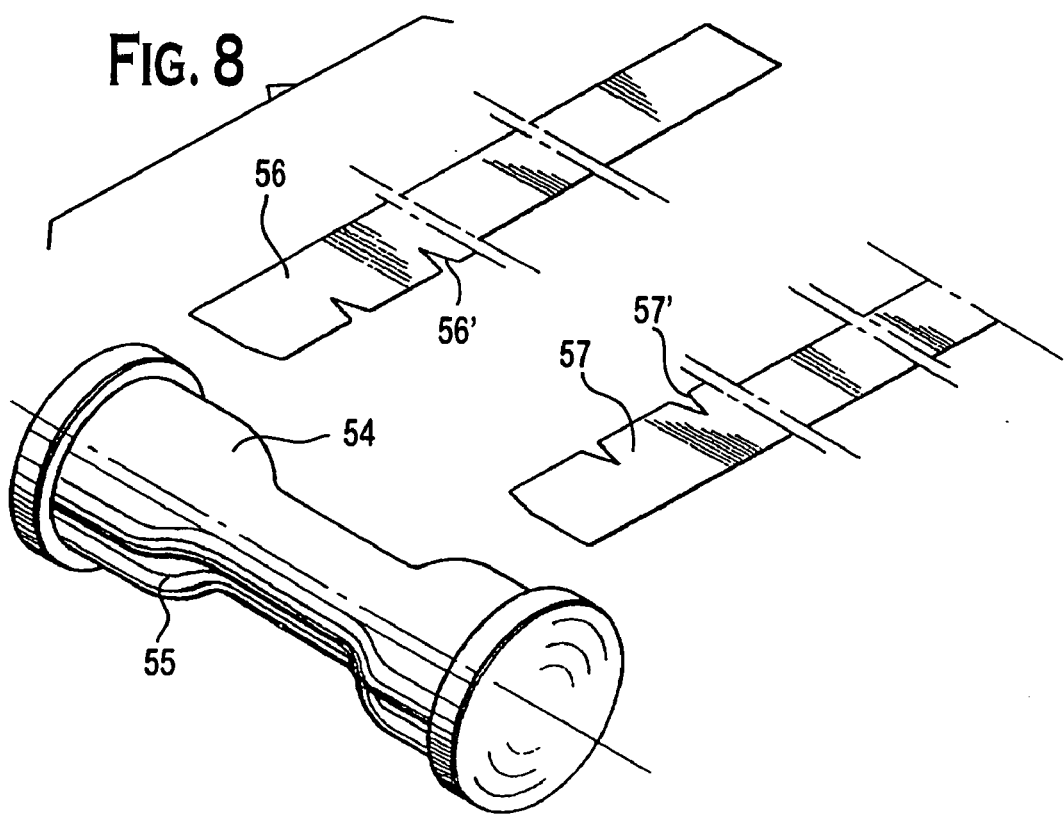
Figure 9:
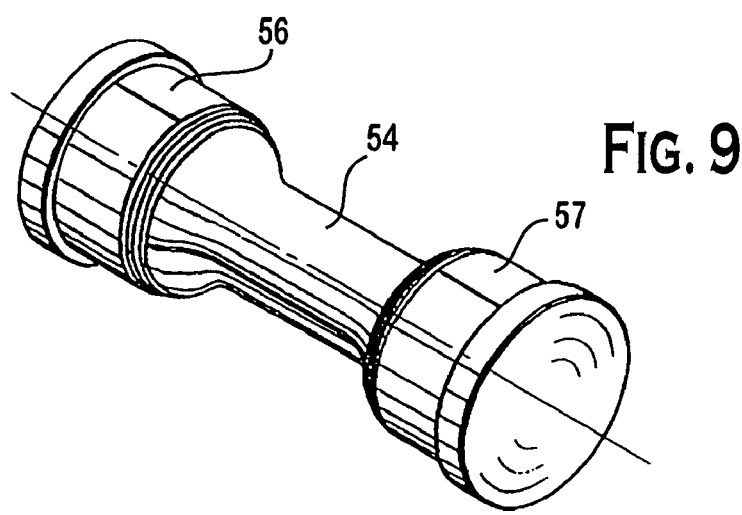
Figure 11:
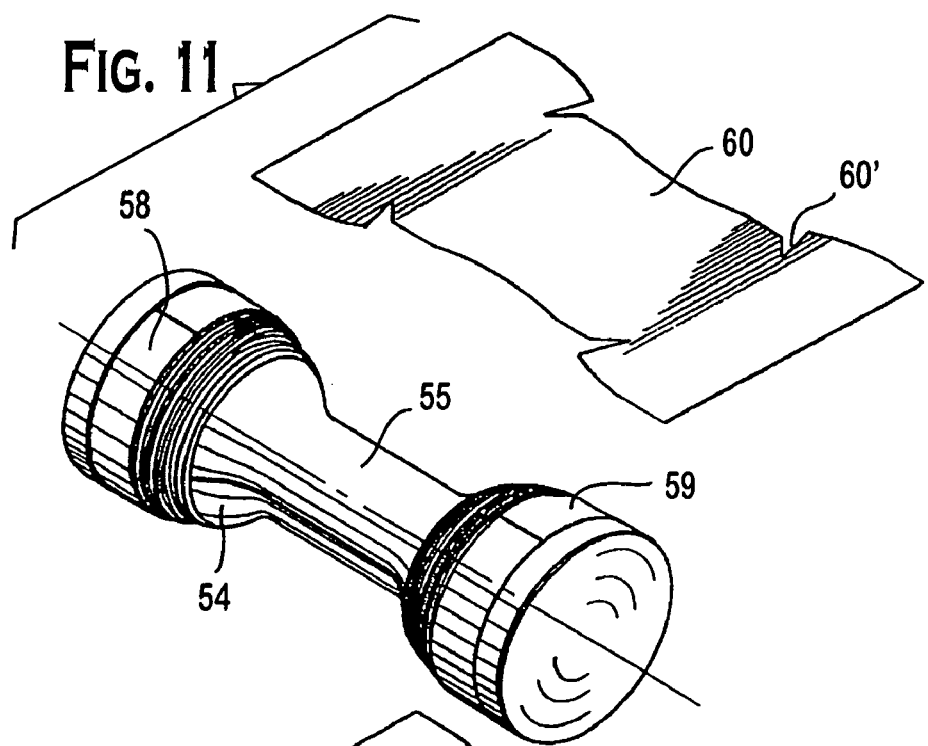
Figure 12:
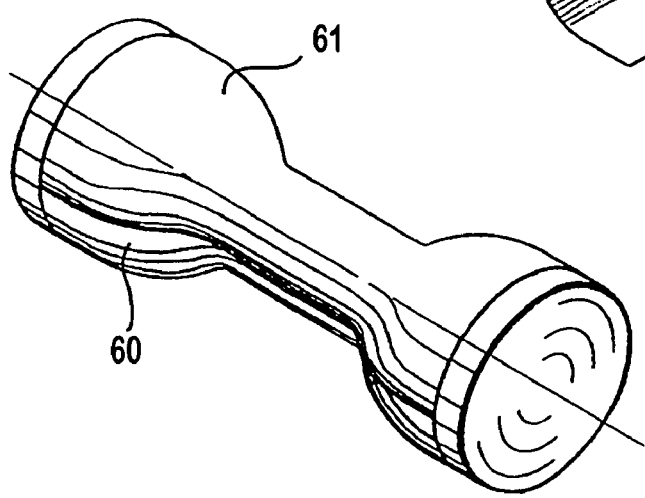

At the end of the phase described above, two strips 56, 57 (presenting triangular cuttings 56' and 57'—FIG. 8) are wrapped over the applied layers in subsequent phases, in correspondence to the ends of the core so to obtain the structure shown in FIG. 9. At this point, two additional strips 58, 59 (presenting triangular cuttings 58' and 59') are additionally wrapped over the end of the core (FIG. 10), after which two additional plies 60, 61, (presenting triangular cuttings 60' and 61') which are diametrically opposite and which shape is shown in FIG. 11 are applied. The plies 60, 61 are obviously applied in two subsequent moments, to obtain the structure shown in FIG. 12, where said plies join the end layers so to additionally increase the axial resistance of the layered body.

Figure 13:
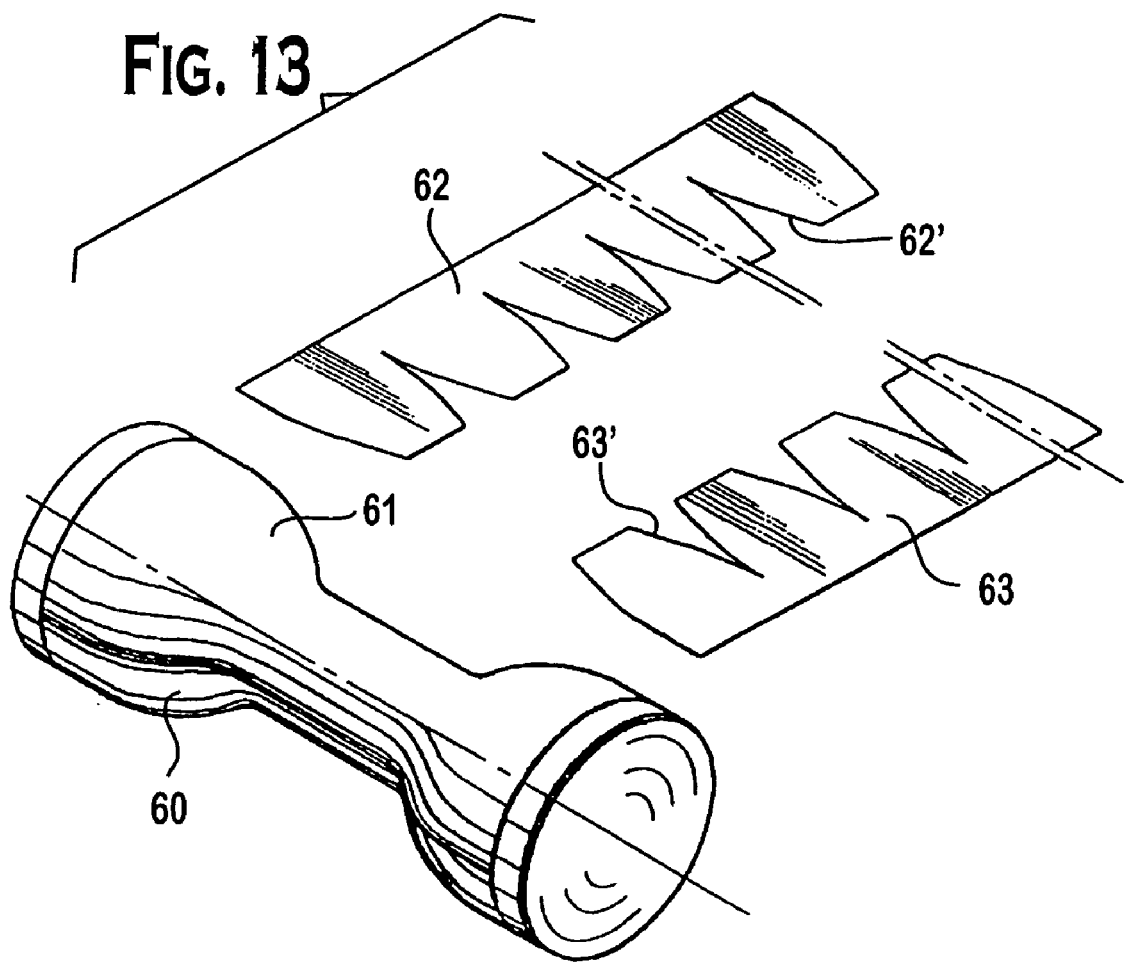
Figure 14:
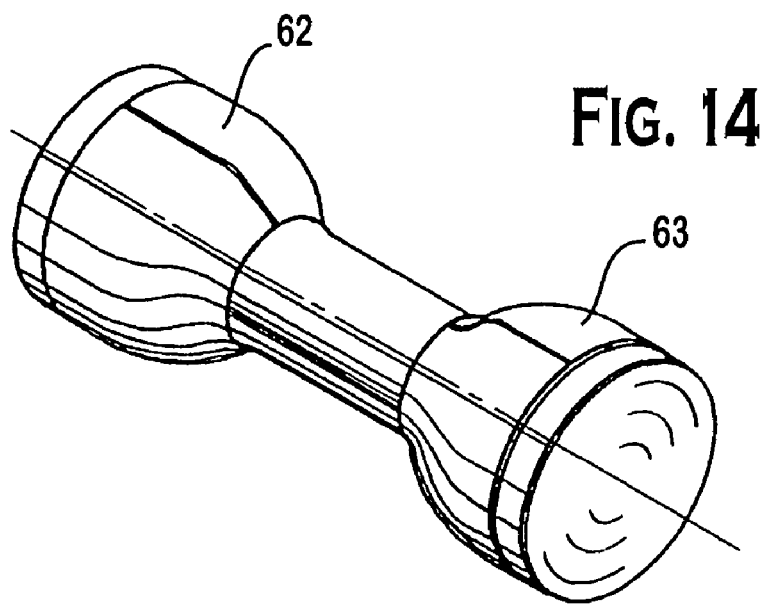

The method ends with the application of two additional strips 62, 63, (presenting triangular cuttings 62' and 63') which shape is shown in FIG. 13, which are wrapped around the ends of the core in two subsequent moments so to obtain the structure visible in FIG. 14, after which a last strip 64 is applied, which shape is shown in FIG. 15, and wrapped around the central part of the core, so to finally obtain the structure shown in FIG. 16.

The illustrated strips 50, 51, 56, 57, 62, 63 present triangular cuttings 50', 51' 56', 57', 62' 63'on one side, but they could present triangular cuttings on both sides. Said strips can also present, on one or on both sides, cuttings of other shapes, such as circular, oval, squared, rectangular, rectilinear and so on, or any combination thereof, the cuttings being perpendicular or inclined with respect to the edges of the strips. Further, it is also possible to choose the number, the depth, the width and the inclination of the cuttings. The strips 50, 51, 56, 57, 62, 63 could also present, on one or on both sides, extensions of different shapes, such as circular, oval, squared, rectangular, triangular and so on, or any combination thereof, the extensions being perpendicular or inclined with respect to the edges of the strips. Further, it is also possible to choose the number, the depth, the width and the inclination of the extensions. Finally, a combination of cuttings and/or extensions, on one or on both sides of the strips can be chosen in such a way as to obtain substantially any kind of thickness and shape such as, for example, the ones showed in FIG. 22.

As described, the strips and the plies are arranged alternately with each other, so as to achieve the best result in terms of thickness and axial resistance.

Once the method is ended, a tubular body 9 is formed on the core (FIG. 16) a central constant section 10, and two bell-shaped ends 11, 12, which diameter is larger. Furthermore, the thickness of the pre-formed tubular body 9 progressively increases from the central section 10 in the direction of the ends or, as can be seen in FIG. 17, there is a central part (A) of constant section, end parts (C) with constant section, but larger than the central one and intermediate parts (B) with increasing sections. Finally, the two ring end flanges 7, 8 of the core 1 axially contain the ends of the pre-formed tubular body 9.

The assembly consisting of the core 1, comprising the two elements 3, 4 and the pre-formed tubular body 9 wrapped around it, is positioned in the cylindrical cavity 13 of a moulding apparatus 14 (see FIG. 18). The cylindrical cavity 13 is formed by an upper half mould 15 and a lower half mould 16, presenting a conformation which corresponds to that of the external surface of the hub to be obtained, i.e. substantially corresponding to the external surface of the pre-formed tubular body 9 illustrated in FIG. 16. The ends of the cavity 13 are closed by two caps 17, 18, which are fastened by means of screws 19 to two end flanges of the two half moulds 15, 16. Each of the two caps 17, 18 incorporates a central cylindrical case 20 in which a respective helical spring 21 is arranged. Each of the two helical springs 21 is axially interposed between a bottom wall 20a of the respective tubular case 20 and the respective end surface of the core 1. The two springs 21 elastically press the two elements 3, 4 of the core 1 against each other so that these elements are kept in contact corresponding to their contact plane 22, which is orthogonal to the axis 23 of the core 1.

After arranging the assembly consisting of the core 1 and the pre-formed tubular body 9 wrapped on the core inside the mould, the mould is taken to a temperature sufficient to cause the reticulation of the thermosetting plastic material matrix belonging to the tubular body 9, for example to a temperature comprised in the range from 80° C. to 200° C. This temperature increase is maintained preferably for a time comprised in the range from 10 minutes to 3 hours, preferably in the range from 30 minutes to 3 hours. In this way, the thermosetting matrix reticulates, while the PTFE forming the two elements 3, 4 of the core 1 dilates. This dilation is mainly impressed radially outwards, since the flanges 7, 8 are pressed against the ends of the pre-formed tubular body 9 by the two springs 21. Consequently, a radial pressure is exerted outwards against the tubular body 9, which is thus pushed against the wall of the cylindrical cavity 13. In this way, a uniform pressure is applied on all the parts of the pre-formed tubular body 9, despite the complex conformation of the body illustrated herein, with bell-shaped ends and a progressively increasing thickness, from the centre to the ends. Naturally, during this phase, the springs 21 allow the two elements 3, 4 of the core to distance themselves slightly following the force exerted by the PTFE core against the ring flanges 7, 8.

At the end of the reticulation phase, a cooling phase follows, then the mould is opened and the assembly comprising the core 1 and the body 9 arranged upon it, is extracted. At this point, the elements 3, 4 forming the core 1 are extracted in opposite directions from the body thus obtained, forming the wheel hub according to this invention. The hub thus obtained presents the particularity of being made of structural fibre material, typically carbon fibre material, and being made of a single part, despite the complex geometrical shape described above. The product can naturally be subjected to additional machining (e.g. a set of radial holes can be drilled in the two bell-shaped ends for engaging the spokes) which make the part usable as a bicycle wheel hub.

Many other kinds of hubs with different shapes, illustrated in FIG. 22, can be obtained. In particular, symmetrical and asymmetrical hubs with respect to the intermediate plane, hubs with one or two flanges in proximity of one or both ends and hubs with cross-shaped flanges.

With reference to FIGS. 19, 20 and 21, which relate to a second embodiment of the method of the invention, the core 1 is formed by two elements 3, 4 of metal material, e.g. steel, and is externally covered with a sheath 24 made of a high thermal dilatation elastomeric material. Preferably, the elastomeric material forming the aforesaid sheath has a thermal dilation coefficient exceeding $15 \times 10^{-5}$ mm/° C. and a maximum continuous heat resistance temperature exceeding 100° C.

For example, said material forming the core sheath can be a synthetic rubber of the type marketed under the trademark AIRCAST 3700 by Airtech International Inc., Huntington Beach, Calif., USA. This material is preferred for its relatively high thermal dilation coefficient ($15 \times 10^{-5}$ mm/° C.), as well as its high continuous heat resistance (232° C.), for its good thermal conductivity (2.59 W/m° C.) and for its good ultimate tensile stress (680%), which is important to facilitate removing the sheath from the internal surface of the finished product after extracting it from the module and after removing the core.

The sheath is pre-formed according to the configuration of the core (FIG. 4) with a central cylindrical section and two bell-shaped end sections and is preferably dimensioned so to be applied onto the core by stretching it slightly so that the sheath is adherent to the core by effect of its elastic return.

Apart from the above indicated different structure of the core, the method remains identical to that described above with reference to the first embodiment. The assembly consisting of the core 1, comprising the two elements 3, 4, the sheath 24 and the pre-formed tubular body 9 wrapped around it, is positioned in the cylindrical cavity 13 of a moulding apparatus 14 formed by an upper half mould 15 and a lower half mould 16, presenting a conformation which corresponds to that of the external surface of the hub to be obtained, i.e. substantially corresponding to the external surface of the pre-formed tubular body 9 illustrated in FIG. 21. The ends of the cavity 13 are closed by two caps 17, 18 which are fastened by means of screws 19 to two end flanges of the two half moulds 15, 16. Each of the two caps 17, 18 incorporates a central cylindrical case 20 in which a respective helical spring 21 is arranged. Each of the two helical springs 21 is axially interposed between a bottom wall 20a of the respective tubular case 20 and the respective end surface of the core 1. The two springs 21 elastically press the two elements 3, 4 of the core 1 against each other so that these elements are kept in contact corresponding to their contact plane 22, which is orthogonal to the axis 23 of the core 1.

After arranging the assembly consisting of the core 1 and the pre-formed tubular body wrapped on the core inside the mould, the mould is taken to a temperature sufficient to cause the reticulation of the thermosetting plastic material matrix belonging to the tubular body 9, for example to a temperature comprised in the range from 80° C. to 200° C. This temperature increase is maintained preferably for a time comprised in the range from 10 minutes to 3 hours, preferably in the range from 30 minutes to 3 hours. In this way, the thermosetting matrix reticulates, while the synthetic rubber forming the sheath that covers the two elements 3, 4 of the core 1 dilates. This dilation is mainly impressed radially outwards, since the flanges 7, 8 are pressed against the ends of the pre-formed tubular body 9 by the two springs. Consequently, a radial pressure is exerted outwards against the tubular body 9, which is thus pushed against the wall of the cylindrical cavity 13. In this way, a uniform pressure is applied on all the parts of the pre-formed tubular body 9, despite the complex conformation of the body illustrated herein, with bell-shaped ends and a progressively increasing thickness, from the centre to the ends. Naturally, during this phase, the springs 21 allow the two elements 3, 4 of the core to distance themselves slightly following the force exerted on the sheath 24 against the angular flanges 7, 8.

At the end of the reticulation phase, and after a subsequent cooling phase, the mould is opened and the assembly comprising the core 1 and the body 9 arranged upon it, is extracted. At this point, the elements 3, 4 and 10 forming the core are extracted in opposite directions from the body, after which the sheath 24, which initially remains associated to the internal surface of the tubular body, is extracted by elastic deformation. The hub thus obtained presents the particularly of being made of structural fibre material, typically carbon fibre material, and being made of a single part, despite the complex geometrical shape described above. The product can naturally be subjected to additional machining (e.g. a set of radial holes can be drilled in the two bell-shaped ends for engaging the spokes) which makes the part usable as a bicycle wheel hub.

The third embodiment differs from the second one by the fact that the metallic core is divided in sectors and it is not covered by any deformable sheath. In this embodiment the radial pressure to the tubular body is applied by mechanical means which act on the inside of the core, or by arranging the junctions of the metallic sectors with an elastomeric material, by injecting gas inside the metallic core. After the reticulation of the fabric matrix is obtained, and after a subsequent cooling phase, the internal pressure is stopped and the core comes back to its original dimensions, allowing the two elements of the core to be extracted from the reticulated tubular body.

Finally, the apparatus illustrated in FIG. 20 can obviously be modified by arranging a wall of high thermal dilatation material of the type shown above in correspondence to the surface of the mould cavity again by using a core made of two metallic material elements 3, 4. In this case, the thermal dilation of the wall of the cavity would determine the application of a radial pressure from the outside inwards on the external surface of the pre-formed tubular body 9 which would thus be squeezed on the metallic core.

Naturally, numerous changes can be implemented to the construction and forms of embodiment of the invention herein envisaged, all comprised within the context of the concept characterising this invention, as defined by the following claims.

For example, despite that this description and accompanying claims explicitly refer to a bicycle wheel hub, the method according to this invention can obviously be applied to manufacturing other components with a similar shape, particularly other bicycle components. Consequently, also these applications and the deriving products, fall within the scope of this invention.

What is claimed is:

1. A bicycle wheel hub, having a hollow tubular body and an interior diameter that is spaced from a central hub axis extending longitudinally through the hollow tubular body, the hollow tubular body comprising:
    a plurality of fabric strips each strip having a longitudinal axis, the plurality of fabric strips each having fiber fabric incorporated in a matrix material, each of the plurality of fabric strips being spaced from the central hub axis with the strip longitudinal axis oriented generally orthogonally to the central hub axis, and
    a plurality of fabric plies each ply having a longitudinal axis, each of the plurality of fabric plies having fiber fabric incorporated in a material matrix, the plurality of fabric plies each being spaced from the central axis with the ply longitudinal axis oriented generally parallel to the central hub axis, wherein the plurality of fabric plies are integrated with the plurality of fabric strips.

2. The bicycle wheel hub of claim 1, wherein at least some of the plurality of fabric strips and the plurality of fabric plies are interspersed with each other in an overlapping alternating fashion.

3. The bicycle wheel hub of claim 1, wherein the hollow tubular body has first and second ends, at least one of the plurality of fabric strips is located at one of the first and second ends.

4. The bicycle wheel hub of claim 3, wherein at least one of the plurality of fabric strips is located at each of the first and second ends.

5. The bicycle wheel hub of claim 1, wherein the hollow tubular body includes a central portion located between the first and second ends that includes at least one of the plurality of strips.

6. The bicycle wheel hub of claim 1, wherein at least one of the plurality of strips has a plurality of recesses in a lateral edge thereof.

7. The bicycle wheel hub of claim 1, wherein at least one of the plurality of fabric plies extends an entire length of the hub as measured generally parallel to the central hub axis.

8. The bicycle wheel hub of claim 1, wherein the hollow tubular body has first and second ends and a central portion, the first and second ends each comprising a bell shaped portion, a thickness of the hollow tubular body increasing as one moves from the central portion toward one of the first and second ends.

9. The bicycle wheel hub of claim 1, wherein fiber fabric comprises at least one of carbon fibers, glass fibers, and KEVLAR fibers.

10. The bicycle wheel hub of claim 1, wherein the hollow tubular body is symmetrical about a central plane oriented orthogonally to the central hub axis.

11. The bicycle wheel hub of claim 1, wherein the hollow tubular body has a flange proximate an end thereof.

12. The bicycle wheel hub of claim 1, wherein the hollow tubular body has a flange proximate to first and second ends thereof.

13. The bicycle wheel hub of claim 1, wherein the hollow tubular body has a flange proximate an end thereof.

14. A bicycle wheel hub, comprising:
    a plurality of fabric strips each strip having a longitudinal axis, the plurality of fabric strips each having fiber fabric incorporated in a matrix material, each of the plurality of fabric strips having the strip longitudinal axis oriented in a first direction, and
    a plurality of fabric plies each ply having a longitudinal axis, each of the plurality of fabric plies having fiber fabric incorporated in a material matrix, the plurality of fabric plies each having the ply longitudinal axis oriented generally in a second direction orthogonal to the first direction, wherein the plurality of fabric plies are integrated with the plurality of fabric strips and at least some of the plurality of fabric strips and the plurality of fabric plies are interspersed with each other in an overlapping alternating fashion.

15. A bicycle wheel hub, comprising:
a plurality of fabric layers spaced from a central hub axis, the plurality of fabric layers each having fiber fabric incorporated in a material matrix, wherein the plurality of fabric layers are integrated and at least one of the plurality of fabric layers has a plurality of recesses along a lateral edge thereof.

16. A laminated tubular body for use in assembling a bicycle wheel hub, the body comprising:
a plurality of fabric strips having fiber fabric incorporated in a matrix material and a longitudinal axis spaced from and generally orthogonal to a central axis through the body, and
a plurality of fabric plies having fiber fabric incorporated in a material matrix that are laminated with the plurality of fabric strips along a longitudinal axis spaced from and generally parallel to the central axis through the body.

17. The body of claim 16 wherein a plurality of the fabric strips interspersed with a plurality of the fabric plies an overlapping arrangement.

18. The body of claim 17 wherein the overlapping arrangement is an alternating arrangement.

19. The body of claim 16 wherein at least one of the plurality of fabric plies has a length equal to that of the hub as measured along the central axis.

20. The body of claim 16 wherein the fiber fabric comprises at least one of carbon fibers, glass fibers, and KEVLAR fibers.

* * * * *